UNITED STATES PATENT OFFICE.

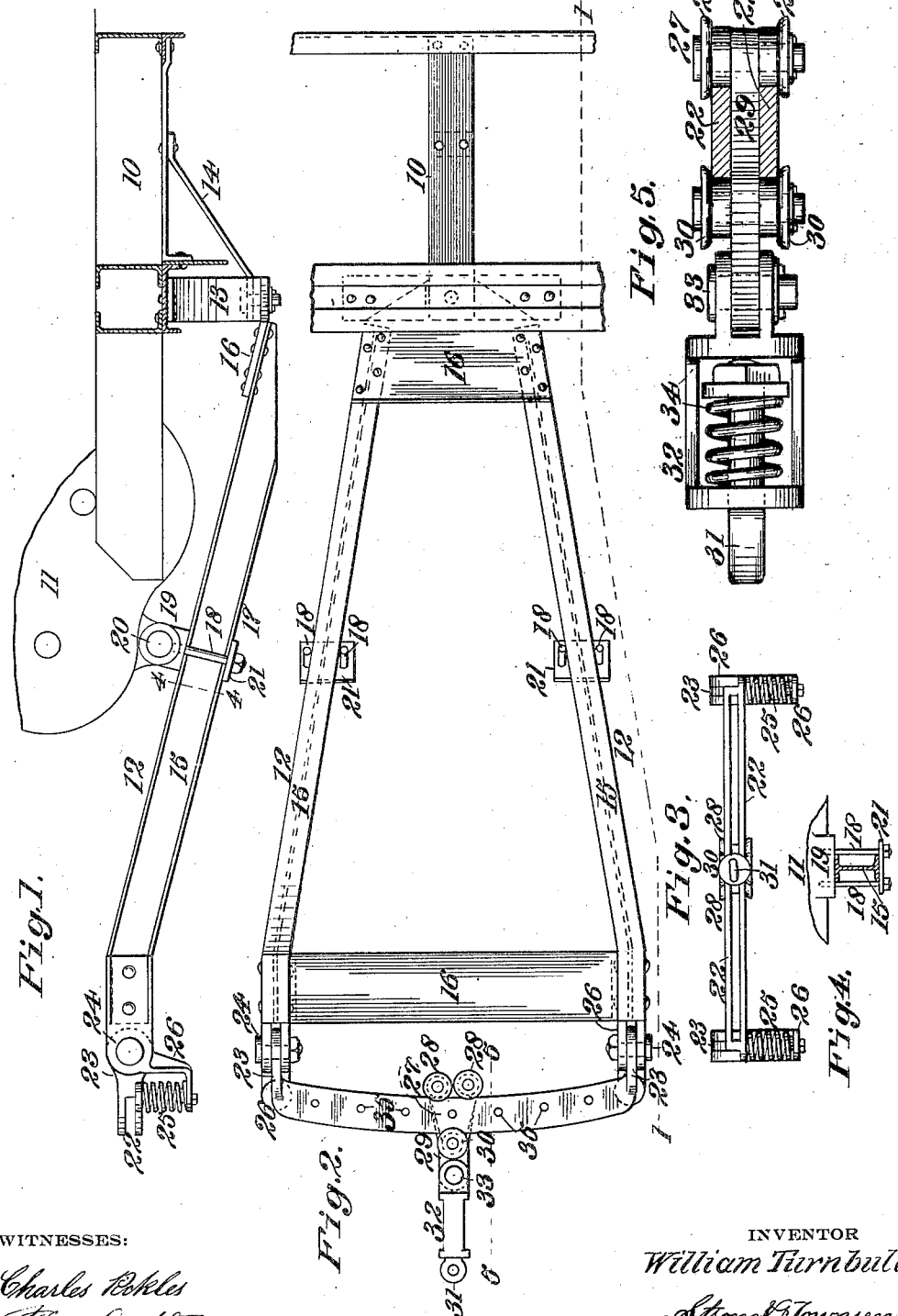

WILLIAM TURNBULL, OF STOCKTON, CALIFORNIA, ASSIGNOR TO THE HOLT MANUFACTURING COMPANY, OF STOCKTON, CALIFORNIA, A CORPORATION OF CALIFORNIA.

DRAFT-RIGGING.

1,326,551.      Specification of Letters Patent.      Patented Dec. 30, 1919.

Application filed January 11, 1917. Serial No. 141,773.

*To all whom it may concern:*

Be it known that I, WILLIAM TURNBULL, a citizen of the United States, residing at Stockton, in the county of San Joaquin and State of California, have invented new and useful Improvements in Draft-Rigging, of which the following is a specification.

This invention relates to draft rigging; and has for its object to simplify and improve the construction and operation of such devices.

In its present form, the invention is in the nature of an attachment for tractors, and comprises a rearwardly and upwardly extending draft frame detachably connected at its front end to the tractor main frame, centrally and below the normal plane thereof, and supported intermediately by a connection with the rear of the tractor; and provided with a horizontally disposed track, at its rear, with which a roller carriage engages, said carriage being shiftable laterally thereon, and a draft link pivotally connected to the carriage on a vertical pivot, said track being hinged to the draft frame on horizontal pivots so that lateral and vertical strains are removed from the draft frame.

One form which my invention may assume is exemplified in the following description and illustrated in the accompanying drawings, in which—

Figure 1 shows a side elevation of the draft rigging, including a portion of the tractor frame shown in section, along the dotted line 1—1 of Fig. 2.

Fig. 2 shows a plan view of the device shown in Fig. 1, certain of the parts being broken away for the sake of clearness.

Fig. 3 shows a rear elevation of the draft rigging.

Fig. 4 shows a sectional view on the line 4—4 of Fig. 1.

Fig. 5 shows a sectional view on the line 5—5 of Fig. 2.

In the drawing, I show a tractor frame 10, having a transmission casing 11 arranged at its rear end. A draft frame 12 is detachably connected at its forward end to a downwardly bowed strip 13, bolted to the underside of the main frame and braced by a diagonal bar 14. The draft frame 12 is made up of rearwardly diverging and upwardly extending side bars 15 secured together at their ends by cross plates 16. Intermediate the ends of the side bars are clips 17 for suspending the same from the rear end of the tractor.

In the present tractor to which this invention is applied, the side bars of the main frame terminate short of the rear end of the tractor and consequently the clips 17 must be connected to the transmission case 11 or other part of the tractor mechanism not capable of sustaining any severe strains. The clips include bolts 18 threaded into a block 19 on the transmission case below the shaft 20 and plates 21 below the side bars 15 held by nuts on the bolts 18.

At the rear ends of the side bars 15 a curved track is arranged, said track being in the form of vertically spaced track members 22 slightly bowed and carried by forwardly extending arms 23, the latter hinged by horizontal pivots 24 to the rear ends of the side bars 15. Beneath the track members are cushion springs 25 resting upon brackets 26, the latter integral with the rear ends of the side bars 15, whereby the track members are held normally in a horizontal plane. A roller carriage 27 is fitted to the track members and comprises two pairs of flanged rollers 28, at the front edge of the track members, journaled on vertical pivots secured to a body plate 29, the latter extending between the spaced track members and one roller 28 of each pair being above and the other below the body plate, for engaging with top and bottom track members, respectively. At the rear edge of the track members a single pair of rollers 30 is arranged upon the body plate in engagement with the top and bottom track members. A draft link 31 for connection with the vehicle or implement to be drawn is swiveled in a head 32, and the latter is pivoted to the body plate 29 by means of a vertical pivot 33. Between the draft link 31 and the head 32 is a compressible coil spring 34 forming a yielding connection between the parts.

The track members 22 are preferably provided with spaced openings 35 to receive a pin which also projects through the body plate 29, whereby to retain the roller carriage in any position of adjustment to either side of the center of the track, when it is desired for any reason to employ an off-side draft connection. For tractors, and particularly the self-laying track type, the draft rigging should connect well forward of the main frame and below the same in order to obtain the maximum tractive effect of the tractor. The forwardly and downwardly extending draft frame 12, shown and described herein, produces the desired effect in this respect. The manner of connecting the draft frame at its front to the main frame and suspending it intermediately from the transmission casing is such as to relieve all tensional strains from said casing, and the hinged track members act in a way to prevent any vertical strains being thrown upon the draft frame and consequently upon the transmission casing.

The track and roller carriage permit ready adjustment of the position of the draft connection for plowing or other purposes where it is desired to have an off-center hitch. For a central hitch the carriage may be left free to ride upon the track, thus permitting greater flexibility in turning and also acting to take off any lateral strains from the draft frame 12. The curvature of the track members is such that the roller carriage will maintain a central position thereon when the draft is in a straight line. The pivotal connection between the draft link head 32 and the roller carriage permits flexibility in turning, even though the roller carriage be locked to the track, and owing to the short length of the draft link and swivel head the draft and drawn vehicles are prevented from straying too far out of line at any and all times. The swivel connection for the draft link allows relative tilting between the draft and drawn vehicles without imposing any severe strains upon the draft rigging and the yielding connection between said draft link and its head lessens the danger of breakage, due to sudden starting or striking of obstructions by the drawn implement.

Various changes in the construction and arrangement of the several parts herein shown and described may be employed without departing from the spirit of my invention as disclosed in the appended claims.

Having thus described my invention, what I claim and desire to secure by Letters Patent is—

1. In a draft rigging for tractors, the combination with a rigidly supported draft frame embodying rearwardly projecting members spaced laterally from each other, of a rearwardly curved track pivotally connected at its ends with the ends of said spaced members to swing vertically and a draw head mounted on said track to travel transversely of the vehicle between the pivotal supports of the track.

2. In a draft rigging for tractors, the combination with laterally spaced members and means for rigidly connecting said members at their forward ends and at intermediate points beneath the under framing of a tractor body, of a laterally extending track connected at its ends with the rear ends of said members to swing vertically and a draw head mounted on said track to move laterally, the connection between the draw head and track being such as to cause the track and draw head to swing vertically in unison.

3. In a draft rigging for tractors, the combination with a rigidly supported draft frame embodying divergent rearwardly and upwardly extending members, of a rearwardly curved track pivotally connected at its ends with the rear ends of said members on a horizontal axis forward of the track and a draw head mounted on said track to travel transversely of the vehicle between the pivotal supports of the track.

4. A draft rigging for tractors embodying a transversely extending rearwardly curved track, pivotal supports therefor located at opposite ends and forwardly of the body of the track, and a draw head mounted to travel on the track between the supports.

5. A draft rigging for tractors embodying a transversely extending rearwardly curved track formed of parallel members, pivotal supports therefor located at opposite ends and forwardly of the curved body of the track, a draw head extending between the parallel members of the track and flanged rollers on said draw head having their flanges extending over and under the track members respectively.

6. A draft rigging for tractors embodying downwardly and forwardly converging frame members, rigidly connected together with means for rigid attachment to the tractor frame at the forward end and at an intermediate point, a rearwardly curved track bridged between the rear ends of the frame members and at its ends pivotally connected therewith to swing on a horizontal axis, a draw head mounted to travel on said track and springs at the opposite ends of the track for resiliently supporting the track against downward movement.

In testimony whereof I have hereunto set my hand in the presence of two subscribing witnesses.

WILLIAM TURNBULL.

Witnesses:
J. G. SMITH,
W. J. TALBOT.